(12) United States Patent
Lee

(10) Patent No.: US 6,292,440 B1
(45) Date of Patent: Sep. 18, 2001

(54) MP3 CAR PLAYER

(75) Inventor: Sang-Hun Lee, Seoul (KR)

(73) Assignee: IDS Corporation, Seoul (KR)

( * ) Notice: Subject to any disclaimer, the term of this patent is extended or adjusted under 35 U.S.C. 154(b) by 0 days.

(21) Appl. No.: 09/419,177

(22) Filed: Oct. 15, 1999

(30) Foreign Application Priority Data

Nov. 2, 1998 (KR) .................................................. 98-46785

(51) Int. Cl.[7] .................................................. H04H 9/00
(52) U.S. Cl. .................................................. 369/7
(58) Field of Search .................... 369/7, 6, 1, 2, 369/10, 11, 12, 25, 21

(56) References Cited

U.S. PATENT DOCUMENTS 6,061,306 * 5/2000 Buchheim .................. 369/2

FOREIGN PATENT DOCUMENTS

2000105598 * 4/2000 (JP).
200014944 * 5/2000 (JP).

* cited by examiner

*Primary Examiner*—Tan Dinh
(74) *Attorney, Agent, or Firm*—Fish & Richardson P.C.

(57) ABSTRACT

Disclosed is a MP3 car player which prevents a compact disk (CD) player equipped in a car from discontinuing playing of a CD as a result of bumpy road conditions, etc., is able to use both conventional CDs and MP3 CD-ROMs, and compresses and decompresses audio data at a high compression ratio to enable the recording of 150~200 songs in a single CD-ROM without the loss of sound quality, thereby making use of the expensive CD changer unnecessary. The present invention comprises a file type detector, an MP3 file input unit, a peripheral interface unit, a controller unit, an MP3 decoder, and a digital/analog converter.

5 Claims, 3 Drawing Sheets

MP3 CAR PLAYER

BACKGROUND OF THE INVENTION (a) Field of the Invention

The present invention relates to a Moving Picture Experts Group (MPEG) audio layer-3 (MP3) player. More specifically, the present invention relates to a MP3 car player equipped with a compact disk (CD) player in which interruptions in the playing of CDs caused by bumpy road conditions, etc. are prevented, and which is able to compress and decompress digital audio data at high compression rates without loss of sound quality.

(b) Description of the Related Art

Conventional car CD players use a memory in order to prevent discontinuous sound playing. However, the small capacity of the memory is such that these interruptions can not be completely prevented. Also, since the CD player only plays audio CDs, the CD player cannot process data on the CD Read Only Memory (CD-ROM) which holds far greater compression rates.

In most cases, the MP3 player is used together with a personal computer (PC) which performs downloading and decoding of audio data before uploading into the player. Since the PC utilizes software to perform these functions, the MP3 player is ultimately dependent on the performance of the PC, thereby making real-time implementation difficult unless the user owns a top-of-the-line PC. Such use together with a PC also limits portability. Further, even if the MP3 player is equipped allowing full portability (i.e., to internally perform downloading and decoding), high power consumption is a serious drawback that results in a reduced amount of time the user can use the MP3 player on battery power.

SUMMARY OF THE INVENTION

It is an object of the present invention to provide an MP3 car player having a large memory allowing audio data to be temporarily stored and output, and which can use both the conventional CD and CD-ROM, thereby removing the need for the expensive CD changer often used together with CD players installed in automobiles.

It is another object of the present invention to provide an MP3 car player which implements the use of an MPEG audio layer-3 chip to drive an MPEG decoder, and realizes the integration of peripheral circuits and an interface unit in a separate, single chip.

In one aspect of the present invention, the MP3 car player comprises a display unit displaying information of replaying audio data; a keypad controlling drives of compact disks (CDs) and compact disk read only memories (CD-ROMs); a speaker unit outputting the audio data in a format audible to the human ear; a file type detector reading source data of the CDs and CD-ROMs and determining whether the file of the data is an ordinary audio CD file or an MP3 audio file; an MP3 file input unit receiving the MP audio file detected from the file type detector, and detecting errors and temporarily storing the data in a first memory; an MP3 decoder receiving the MP3 data from the MP3 file input unit and restoring compressed data by use of a Huffman decoding method, and converting the data into pulse code modulation data; a controller unit reading the data stored in the MP3 file input unit, controlling the display unit and the keypad, and writing data to the MP3 decoder; a peripheral interface unit controlling the control signals between the display unit, the keypad, and the controller unit; and a digital/analog converter receiving ordinary audio CD data from the file type detector or receiving pulse code modulation digital data from the MP3 decoder and converting the data into analog data and outputting the data to the speaker unit.

The MP3 file input unit comprises an integrated development environment (IDE) interface unit receiving MP3 audio files determined by the file type detector and performing IDE communications for use in a memory card; an error detector receiving the MP3 file data through the IDE interface unit and checking whether or not the data are normally received, and when errors are detected in the data, returning to an initialization step; and a memory block receiving addresses of a second memory, chip selection signals, and read and write signals from the controller, and controlling the second memory when temporarily storing the errorless MP3 data in the first memory in order to decode the errorless data before transmitting the data to the MP3 decoder.

The peripheral interface unit comprises a display interface unit performing interface operations on displaying items such as titles of audio data or track numbers on the display unit; and a keypad interface unit controlling the operations between the keypad and the controller, the operations including controlling keys which operate the CDs and CD-ROMs and selecting rows and columns of the keypad.

The controller unit comprises a controller reading the data stored in the MP3 file input unit, and displaying information of the audio data on the display device, and outputting the data to the MP3 decoder according to input from the keypad; and a third memory storing instructions to drive the controller, address map information, and bootstrap signals to initialize the operation when power is supplied.

The MP3 decoder comprises an MP3 interface unit handling the data received from the MP3 file input unit for each serial bit; a control and status register controlling a response signal which conveys information of whether or not the data provided to the MP3 interface unit have errors to the controller, and displaying an empty or full status of the provided data; a fourth memory receiving serial data from the MP3 interface unit and storing the data; a parser receiving data from a fifth memory and encoding the data using the Huffman decoding method; an inverse modified discrete cosine transform unit performing inverse modified discrete cosine transform on the data encoded from the parser, and transforming the data into pulse code modulation data; a sixth memory temporarily storing the pulse code modulation data; and a pulse code modulation interface unit receiving the pulse code modulation data from the sixth memory and outputting the data to the digital/analog converter.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
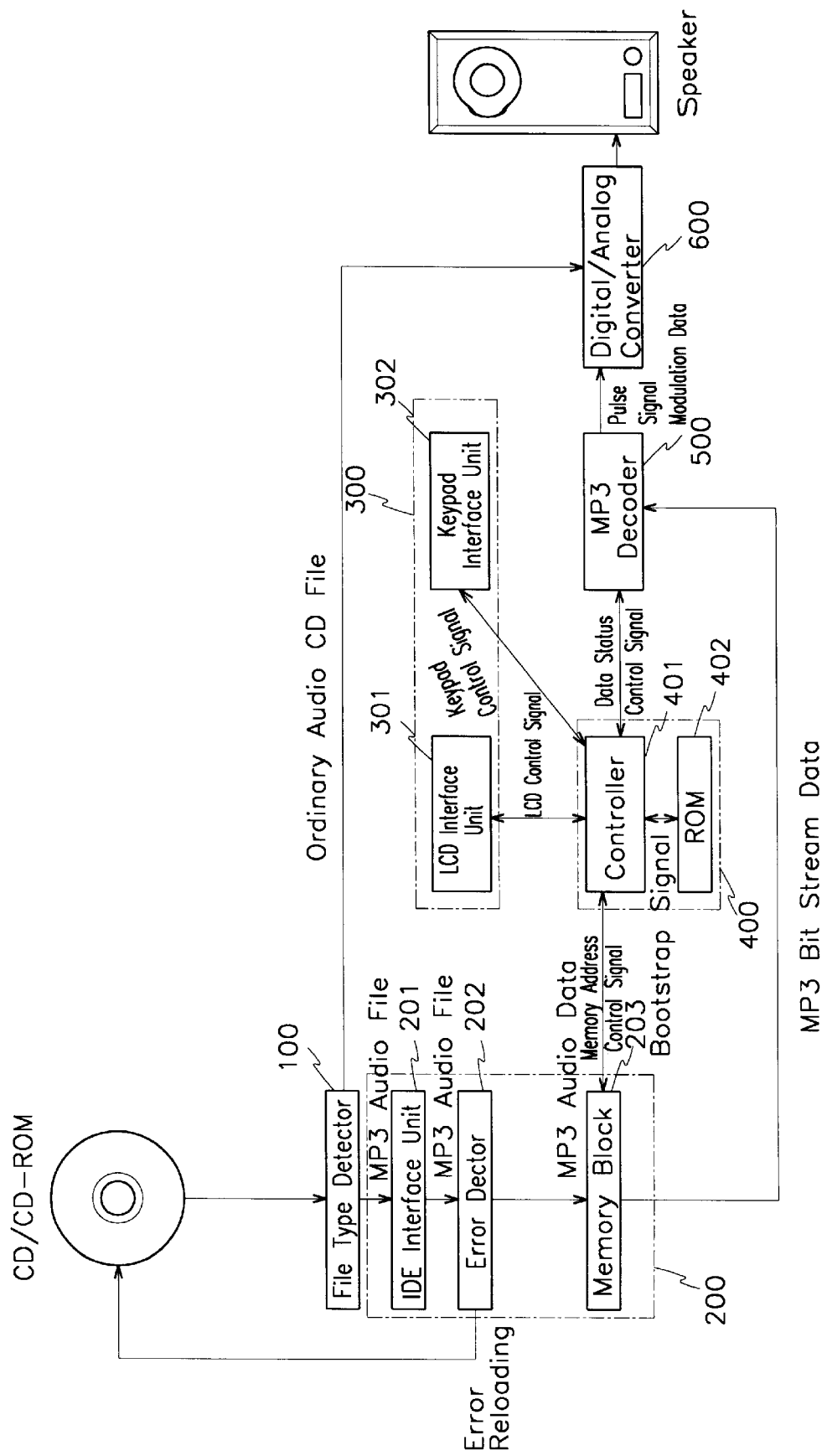
FIG. 1 is a schematic diagram of an MP3 car player configuration according to a preferred embodiment of the present invention.

FIG. 1 shows a schematic diagram of an MP3 car player configuration according to a preferred embodiment of the present invention.

A file type detector 100 receives source data of CDs and CD-ROMs. Output terminals of the file type detector 100 are coupled to an integrated development environment (IDE) interface unit 201 (or digital/analog converter depending on file type). The IDE interface unit 201 receives MP3 audio files from the file type detector 100.

An error detector 202 receives the MP3 audio files from the IDE interface unit 201, and either is reloaded and returned to an initialization step or the error detector 202 outputs data to a memory block 203, depending on whether or not errors are present in the audio data. The IDE interface unit 201, the error detector 202, and the memory block 203 comprise an MP3 file input unit 200.

The memory block 203 receives the MP3 audio files from the error detector 202 and temporarily stores the files.

A controller 401 receives and transmits memory address control signals from/to the memory block 203, and a ROM 402 receives and transmits bootstrap signals from/to the controller 401.

A liquid crystal display (LCD) interface unit 301 and a keypad interface unit 302 receive and transmit control signals from/to the controller 401. The LCD interface unit 301 and the keypad interface unit 302 comprise a peripheral interface unit 300.

An MP3 decoder 500 receives the data stored in the memory block 203, and receives and transmits data status control signals from/to the controller 401.

A digital/analog converter 600 receives audio CD data from the file type detector 100, or receives pulse code modulation digital data from the MP3 decoder 500, converts the data into analog data, amplifies the data in an operational amplifier (not shown), and outputs the converted and amplified data to a speaker.

Figure 3:
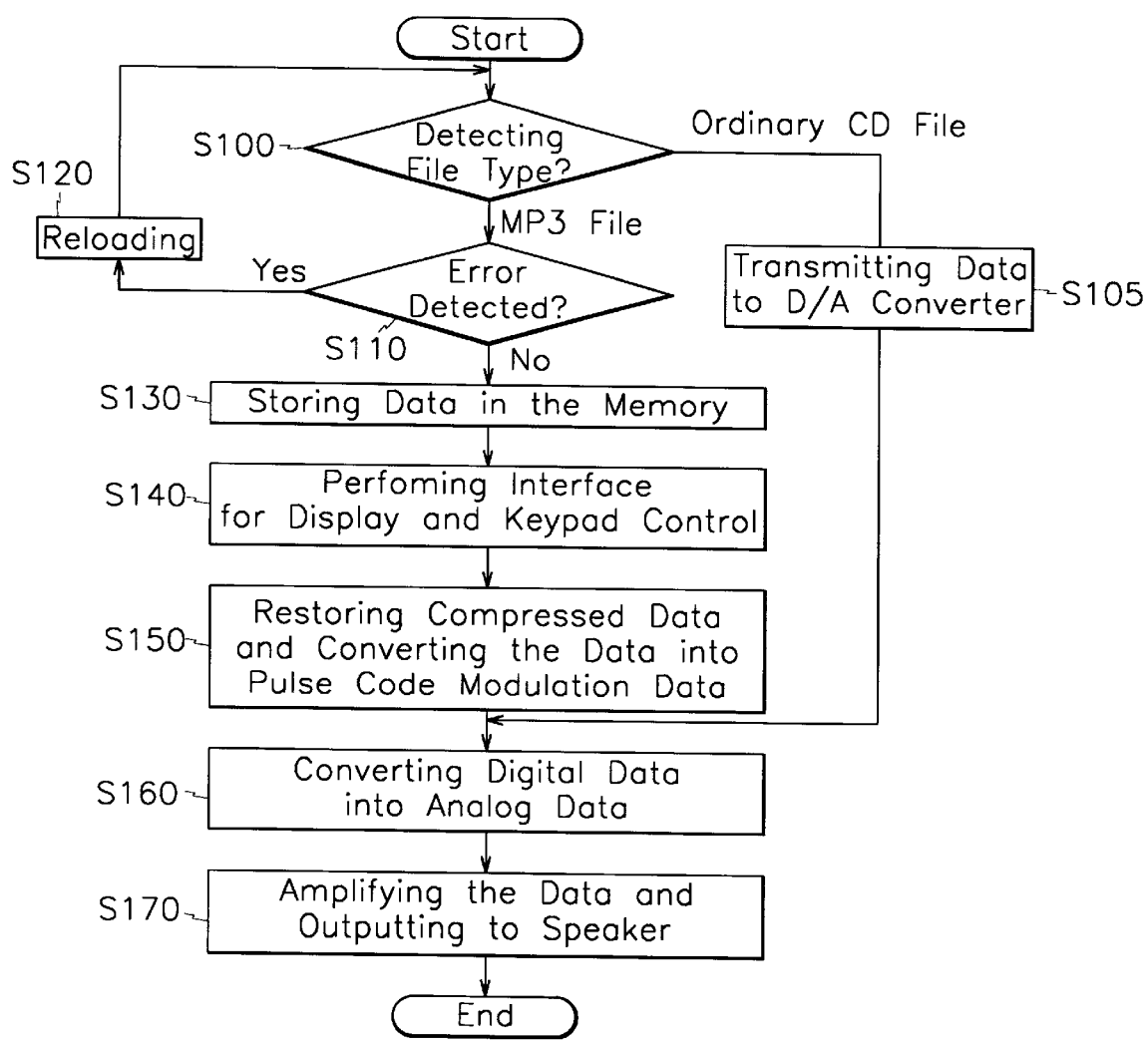
FIG. 3 is a flow chart of an operation of the MP3 player shown in FIG. 1.

An operation of the MP3 car player will now be described with reference to FIG. 1 and the flow chart of FIG. 3. First, the file type detector 100 receives audio data and detects whether the file of the audio data is an ordinary CD file or an MP3 file in step S100.

If the input audio data are ordinary audio CD files, the pulse code modulation audio digital data are transmitted to the digital/analog converter 600 in step S105, after which the digital data are converted into analog data in step S160. Next, the analog data are amplified and output to the speaker in step S170.

If it is determined in step S100 that the input audio data are MP3 files, the data are provided to the MP3 file input unit 200 where the data pass through the IDE interface unit 201 and are transmitted to the error detector 202.

The MP3 file input unit 200, performing IDE communications in the IDE interface unit 201 for use in a memory card, is a type of disk drive interface which uses direct memory access (DMA) channels. The error detector 202, after receiving the data from the IDE interface unit 201, checks whether there exist any errors in the data of the input MP3 files in step S110. If it is determined by the error detector 202 that there are errors in the MP3 files, the error detector 202 is reloaded and the operation of the MP3 player is returned to the first step in step S120. However, if it is determined in step S110 that there are no errors in the input MP3 files, the memory block 203, in step S130, stores the errorless MP3 data for a subsequent decoding operation, transmits the data to the MP3 decoder 500, and receives addresses of a flash memory, chip selecting signal, read/write signal from the controller 401 in order to control the data.

The peripheral interface unit 300 receives the errorless MP3 data, and, in step S140, performs an interface function through (a) the LCD interface unit 301 for the display of the titles of the audio data, track numbers, etc., and (b) the keypad interface unit 302 for enabling the user to control various operations of the MP3 player. With regard to the interface with the keypad interface unit 302, keys such as play, pause, next, and back are provided so the user is able to control operations between a keypad of the keypad interface unit 302 and the controller 401.

Following the above, the MP3 decoder 500 receives the MP3 data from the memory block 203 after the data has passed through the controller 401, and decompresses the compressed data using the Huffman decoding method, after which the MP3 decoder 500 converts the data into pulse code modulation data then transmits the data to the digital/analog converter 600 in step S150. The digital/analog converter 600 converts the data received from the digital/analog converter 600 into analog data in step S160, then amplifies the data in the operational amplifier and outputs the data to the speaker in step S170.

During the operation of the MP3 player described above, the controller unit 400 performs control such that the controller 401 selects the address of the flash memory of the memory block 203, the error detector 202 receives data according to a read signal, the titles of the audio data or track numbers are displayed by the LCD interface unit 301, input of the keypad is received from the keypad interface unit 302, and the data stored in the memory block 203 are output to the MP3 decoder 500 according to a write signal.

The ROM 402 stores instructions to drive the controller 401, address map information, and bootstrap signals to initialize the operation of the MP3 player when power is supplied.

The MP3 decoder 500 will now be described.

Figure 2:
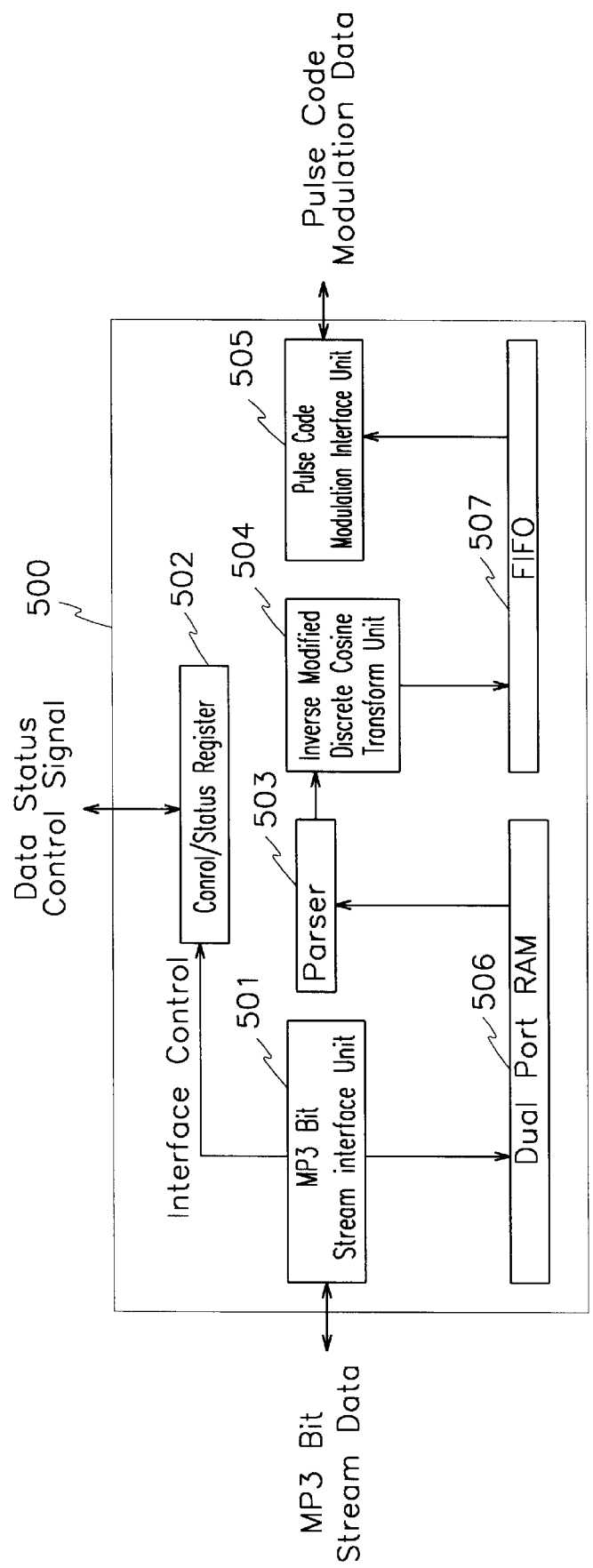
FIG. 2 is a block diagram of an MP3 decoder shown in FIG. 1.

FIG. 2 is a block diagram of the MP3 decoder 500 shown in FIG. 1.

The MP3 decoder 500 comprises an MP3 bit stream interface unit 501; a control/status register 502; a parser 503; an inverse modified discrete cosine transform (MDCT) unit 504; a fifth memory 506; a sixth memory 507; and a pulse code modulation interface unit 505.

The MP3 bit stream interface unit 501 receives MP3 bit stream data from the MP3 file input unit 200, and sequentially processes the MP3 data into units of bits. The control/status register 502 controls a response signal which conveys the information on the errors of the received data to the controller unit 400 in order to perform decoding, and indicates a full or empty status of the received data.

The fifth memory 506 receives and stores the serial data from the MP3 bit stream interface unit 501. The fifth memory 506 is implemented in a dual port random access memory (RAM).

The parser 503 receives data from the fifth memory 506, and encodes the data using the Huffman decoding method. The Huffman decoding method is a statistical encoding method in which frequently generated data codes are represented with a small number of bits, while data codes that are not frequently generated are represented with a relatively large number of bits, thereby reducing the overall size of the data. In the method, generation counts of the data to be compressed must be checked, and the generation counts are stored in a counting table, after which optimized codes are assigned to each data.

The inverse MDCT unit 504 converts the data encoded in the parser 503 into pulse code modulation data through the inverse MDCT. In discrete cosine transform (DCT), natural sound is broken down into frequency components from low to high frequencies, and high frequency components are removed using the characteristic in which sound concentrates in low frequency components, thereby compressing the data. However, since distortions occur in the compression and expansion processes, the data are not completely restored into original form. In order to prevent this problem, a modified DCT (MDCT) has been developed. The MDCT precisely divides the frequency band so as to efficiently use perceptual audio coding and psychoacoustic compression to remove all superfluous information (i.e., the redundant and irrelevant parts of a sound signal that the human ear does not hear). An encoder divides the input data into detailed frequency bands. A cosine transform operation is performed on the frequency bands. Coefficients obtained from the cosine transform operation are divided into direct current components and alternating current components, and are independently quantified, thereby achieving a very large rate of data compression. The MDCT performed in reverse results in inverse MDCT.

The sixth memory 507, which is comprised of first-in first-out memories, temporarily stores the pulse code modulation data converted in the inverse MDCT unit 504, and outputs the data to the digital/analog converter 600 through the pulse code modulation interface unit 505.

In the MP3 car player of the present invention as described above, a large capacity of audio data is temporarily stored in memory and output by control of the user such that interruptions in the playing of audio data (caused by bumpy road conditions, etc.) by a compact disk (CD) player equipped in a car are prevented. Further, the MP3 car player of the present invention is able to use both the conventional CD and MP3 CD-ROMs, and is capable of compressing and decompressing audio data at a high compression ratio to allow the recording of 150~200 songs on a single CD-ROM without losing any sound quality. Such a feature makes the use of the expensive CD changer typically used with automobile CD players unnecessary. In addition, since an exclusive chip for performing MP3 functions can be implemented in hardware, the MP3 audio data can be played in real-time and without the need for a PC. Also, the peripheral circuit and interface circuit can be implemented in a single chip so that chip area and power consumption are reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An MP3 car player, comprising:

a display unit displaying information of replaying audio data;

a keypad controlling drives of compact disks (CDs) and compact disk read only memories (CD-ROMs);

a speaker unit outputting the audio data in a format audible to the human ear;

a file type detector reading source data of the CDs and CD-ROMs and determining whether the file of the data is an ordinary audio CD file or an MP3 audio file;

an MP3 file input unit receiving the MP audio file detected from the file type detector, and detecting errors and temporarily storing the data in a first memory;

an MP3 decoder receiving the MP3 data from the MP3 file input unit and restoring compressed data by use of a Huffman decoding method, and converting the data into pulse code modulation data;

a controller unit reading the data stored in the MP3 file input unit, controlling the display unit and the keypad, and writing data to the MP3 decoder;

a peripheral interface unit controlling the control signals between the display unit, the keypad, and the controller unit; and a digital/analog converter receiving ordinary audio CD data from the file type detector or receiving pulse code modulation digital data from the MP3 decoder and converting the data into analog data and outputting the data to the speaker unit.

2. The MP3 car player in claim 1, wherein the MP3 file input unit comprises:

an integrated development environment (IDE) interface unit receiving MP3 audio files determined by the file type detector and performing IDE communications for use in a memory card;

an error detector receiving the MP3 file data through the IDE interface unit and checking whether or not the data are normally received, and when errors are detected in the data, returning to an initialization step; and a memory block receiving addresses of a second memory, chip selection signals, and read and write signals from the controller, and controlling the second memory when temporarily storing the errorless MP3 data in the first memory in order to decode the errorless data before transmitting the data to the MP3 decoder.

3. The MP3 car player in claim 1, wherein the peripheral interface unit comprises:

a display interface unit performing interface operations on displaying items such as titles of audio data or track numbers on the display unit; and a keypad interface unit controlling the operations between the keypad and the controller, the operations including controlling keys which operate the CDs and CD-ROMs and selecting rows and columns of the keypad.

4. The MP3 car player in claim 1, wherein the controller unit comprises:

a controller reading the data stored in the MP3 file input unit, and displaying information of the audio data on the display device, and outputting the data to the MP3 decoder according to input from the keypad; and a third memory storing instructions to drive the controller, address map information, and bootstrap signals to initialize the operation when power is supplied.

5. The MP3 car player in claim 1, wherein the MP3 decoder comprises:

an MP3 interface unit handling the data received from the MP3 file input unit for each serial bit;

a control and status register controlling a response signal which conveys information of whether or not the data provided to the MP3 interface unit have errors to the controller, and displaying an empty or full status of the provided data;

a fourth memory receiving serial data from the MP3 interface unit and storing the data;

a parser receiving data from a fifth memory and encoding the data using the Huffman decoding method;

an inverse modified discrete cosine transform unit performing inverse modified discrete cosine transform on the data encoded from the parser, and transforming the data into pulse code modulation data;

a sixth memory temporarily storing the pulse code modulation data; and a pulse code modulation interface unit receiving the pulse code modulation data from the sixth memory and outputting the data to the digital/analog converter.

* * * * *